United States Patent
Kubota et al.

(10) Patent No.: US 7,580,449 B2
(45) Date of Patent: Aug. 25, 2009

(54) DSSS AND OFDM TWO-WAY WAITING RECEPTION METHOD AND WIRELESS LAN APPARATUS

(75) Inventors: Syuji Kubota, Tokyo (JP); Mayuko Ueno, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 572 days.

(21) Appl. No.: 11/400,641

(22) Filed: Apr. 6, 2006

(65) Prior Publication Data

US 2006/0227700 A1  Oct. 12, 2006

(30) Foreign Application Priority Data

Apr. 8, 2005 (JP) ............................. 2005-112212
Apr. 8, 2005 (JP) ............................. 2005-112213

(51) Int. Cl.
*H04B 1/00* (2006.01)

(52) U.S. Cl. ...................... 375/150; 375/260; 375/343

(58) Field of Classification Search ................ 375/316, 375/340, 354, 142, 147, 150, 260, 343
See application file for complete search history.

(56) References Cited

U.S. PATENT DOCUMENTS

2004/0032825 A1  2/2004  Halford et al.
2004/0252641 A1*  12/2004  Bagchi et al. ............... 370/230

FOREIGN PATENT DOCUMENTS

JP  2005-57807  3/2005

OTHER PUBLICATIONS

Draft Supplement to Standard Information Technology—telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz band, IEEE Standards, 802.11g, Apr. 2003.
Jul. 18, 2006 Communication and European Search Report.
IEEE Standards, 802.11g, Jun. 27, 2003.

* cited by examiner

*Primary Examiner*—David B Lugo
(74) *Attorney, Agent, or Firm*—Cooper & Dunham, LLP

(57) ABSTRACT

A DSSS and OFDM two-way waiting reception method is disclosed. The reception method includes the steps of (a) maintaining a two-way waiting state if none of an RSSI trigger, an OFDM search trigger, and a DSSS search trigger is generated; (b) switching to an RSSI-activated OFDM reception state if the RSSI trigger is generated in the two-way waiting state; (c) switching to a DSSS reception state if an OFDM synchronization loss trigger is generated in the RSSI-activated OFDM reception state; (d) switching to an OFDM search-activated OFDM reception state if the OFDM search trigger is generated in the two-way waiting state; (e) switching to the DSSS reception state if the DSSS search trigger is generated and the OFDM synchronization loss trigger is generated in the OFDM search-activated OFDM reception state; and (f) switching to the DSSS reception state if the DSSS search trigger is generated in the two-way waiting state.

9 Claims, 11 Drawing Sheets

DSSS AND OFDM TWO-WAY WAITING RECEPTION METHOD AND WIRELESS LAN APPARATUS

BACKGROUND

1. Technical Field

This disclosure relates to a wireless LAN apparatus supporting both DSSS and OFDM and a reception method therein.

2. Description of the Related Art

Standardization of the wireless LAN technology has progressed in IEEE 802.11 (Institute of Electrical and Electronics Engineers 802.11), and wireless LANs have been introduced to replace or be used in parallel with the conventional wired networks.

DSSS (Direct Sequence Spread Spectrum) is employed in IEEE 802.11b (hereinafter referred to as "802.11b"), and OFDM (Orthogonal Frequency Division Multiplexing) is employed in IEEE 802.11a. Further, the contents of IEEE 802.11g (hereinafter referred to as "802.11g") are compliant with both DSSS and OFDM.

In the case of supporting both DSSS and OFDM, a DSSS part compliant with DSSS and an OFDM part compliant with OFDM are provided separately because signal processing in a baseband (BB) part to process a baseband signal differs between DSSS and OFDM although an antenna and a radio frequency (RF) part to process a radio frequency signal can be shared. Further, an automatic gain control (AGC) processing part to control the gain of the RF part, a correlation detection part to determine whether the signal is of a desired modulation method, and a demodulation part to demodulate data are provided in each of the DSSS part and the OFDM part. In general, the demodulation parts compliant with the respective methods have appropriate input gains different from each other. Therefore, AGC in the RF part should be performed independently for each of the DSSS part and the OFDM part, and cannot be performed for the DSSS part and the OFDM part at the same time.

As a conventional method in the case of supporting both DSSS and OFDM, AGC in the RF part is performed on the OFDM part side where the peak-to-average ratio of a signal waveform is high so that distortion is likely to be caused at the time of amplification, and in the DSSS part, every received signal fed thereto from the RF part is digitally amplified by a certain gain (for example, 6 dB) and input to the demodulation part.

Conventionally, as described above, AGC of the RF part is performed on the OFDM part side, while every received signal fed from the RF part to the DSSS part is digitally amplified by a certain gain in the DSSS part. However, this method has the following disadvantages.

That is, there is no problem on the OFDM part side because AGC is performed so as to control the gain to an optimal value necessary for the OFDM part. On the DSSS part side, however, the gain is not always optimal under actual conditions because the reception signal multiplied by a certain number on the OFDM side is merely fed to the DSSS part. This may result in insufficient reception performance. Further, digital amplification of the reception signal fed to the DSSS part reduces the resolution of the reception signal. This also results in insufficient reception performance.

Further, the IEEE 802.11 standards target a burst signal. A preamble signal for signal detection and synchronization is added to the head of the burst signal. The 802.11g standard supports OFDM modulation in addition to DSSS/CCK modulation employed in the 802.11b standard in order to realize the upward compatibility of the 802.11b standard and to perform high-speed communications.

In the 802.11g standard, it is specified by a protocol whether to transmit a DSSS/CCK signal or an OFDM signal in order to realize backward (downward) compatibility with the 802.11b standard. If an 802.11b terminal is in the same network, notice is given, in advance through packet transmission by a DSSS/CCK modulated signal, of time for which the network is occupied, and OFDM communications are performed within the time.

Thus, the 802.11g-compliant receiver is required to be ready to receive both a DSSS/CCK modulated signal and an OFDM modulated signal at the same time. Therefore, it is necessary to simultaneously operate both demodulators in parallel in the 802.11g-compliant receiver. It is preferable, however, that both demodulators not operate simultaneously in order to reduce power consumption as well. Therefore, it is preferable to cause only both signal detectors to operate, and after signal detection, to cause one of the demodulators selected by the detection to operate.

However, AGC control and antenna switching should also be counted in considering the operations of both signal detectors. This makes it difficult to cause all the operations of both signal detectors to be performed in parallel with each other, and RF control such as AGC should be performed sequentially.

An OFDM preamble detector can realize an initial trigger by RSSI detection when power is high. However, it is also necessary to detect a signal at high speed with a correlation detector even when the signal has low power. Therefore, in the initial signal detection, initial triggering is performed by correlation detection with the time for one symbol being 0.8 μs. Therefore, correlation processing is performed by cross-correlation. Further, the detection threshold is not too high in order to ensure generation of a trigger. That is, first of all, a trigger is generated, and then determination is made with certainty in the subsequent process.

After the initial detection, the OFDM receiver performs AGC processing at high speed using an RSSI signal value. Further, antenna switching is performed every time a burst wave is received. The AGC processing and antenna switching of OFDM should be performed in approximately 5 μs of an 8 μs period (=a short preamble period of 0.8 μs×10). When AGC is determined, detailed correlation detection, synchronization, and coarse adjustment of frequency offset are performed in the remaining approximately 3 μs.

A DSSS preamble detector for reception performs Barker code correlation processing. In general, a Barker code correlator has good noise immunity, and therefore is highly discriminative even if the input signal is an OFDM preamble signal.

The AGC processing of the DSSS part takes time because it is of a feedback type and does not use DSSS. Further, there is also the problem of frequency offset. Accordingly, the number of times of feedback should be increased if the accuracy of AGC is required.

The time for one DSSS symbol is 1 μs, and the time for one OFDM symbol is 0.8 μs. Accordingly, the OFDM detector makes determination first.

Here, it is assumed that a DSSS signal is input. The input DSSS signal has a square wave-like waveform. Since the OFDM correlator is a cross-correlator, the OFDM correlator is likely to wrongly detect a square wave-like waveform. Therefore, if wrong detection is performed on the OFDM side where the initial trigger makes determination earlier, even synchronization detection is performed after OFDM AGC/

ANT processing. Thus, after detection of synchronization error, OFDM processing is switched to DSSS processing.

However, it is necessary to perform AGC processing within 20 μs from the input of the signal. Therefore, considering that the transition from OFDM processing requires 8 μsec because of synchronization error, earlier switching to DSSS processing is more desirable.

SUMMARY

According to an aspect of this disclosure, there is provided a DSSS and OFDM two-way waiting reception method and a wireless LAN apparatus that can cause each of a DSSS part compliant with DSSS and an OFDM part compliant with OFDM to operate in an optimal condition in the case of supporting both DSSS and OFDM.

According to another aspect of this disclosure, there is provided a DSSS and OFDM two-way waiting reception method and a wireless LAN apparatus that perform DSSS AGC processing with accuracy.

According to an embodiment of this disclosure, there is provided a DSSS and OFDM two-way waiting reception method in a wireless LAN apparatus supporting DSSS and OFDM, the DSSS and OFDM two-way waiting reception method including the steps of: (a) maintaining a two-way waiting state if none of an RSSI trigger, an OFDM search trigger, and a DSSS search trigger is generated; (b) making a transition to an RSSI-activated OFDM reception state if the RSSI trigger is generated in the two-way waiting state; (c) making a transition to a DSSS reception state if an OFDM synchronization loss trigger is generated in the RSSI-activated OFDM reception state; (d) making a transition to an OFDM search-activated OFDM reception state it the OFDM search trigger is generated in the two-way waiting state; (e) making a transition to the DSSS reception state if the DSSS search trigger is generated and the OFDM synchronization loss trigger is generated in the OFDM search-activated OFDM reception state; and (f) making a transition to the DSSS reception state if the DSSS search trigger is generated in the two-way waiting state.

According to an embodiment of this disclosure, there is provided a wireless LAN apparatus supporting DSSS and OFDM including: an RF interface part configured to provide interface with an RF part and to control an operation of each of a DSSS part to perform DSSS demodulation and an OFDM part to perform OFDM demodulation, wherein the RE interface part causes a two-way waiting state to he maintained if none of an RSSI trigger, an OFDM search trigger, and a DSSS search trigger is generated; causes a transition to an RSSI-activated OFDM reception state if the RSSI trigger is generated in the two-way waiting state; causes a transition to a DSSS reception state if an OFDM synchronization loss trigger is generated in the RSSI-activated OFDM reception state; causes a transition to an OFDM search-activated OFDM reception state if the OFDM search trigger is generated in the two-way waiting state; causes a transition to the DSSS reception state if the DSSS search trigger is generated and the OFDM synchronization loss trigger is generated in the OFDM search-activated OFDM reception state; and causes a transition to the DSSS reception state if the DSSS search trigger is generated in the two-way waiting state.

According to a DSSS and OFDM two-way waiting reception method and wireless LAN apparatus, in the case of supporting both DSSS and OFDM, a DSSS part compliant with DSSS or an OFDM part compliant with OFDM is caused to operate selectively depending on the reception state of a signal. Accordingly, it is possible to cause the OFDM part and the DSSS part to perform processing such as AGC separately, so that it is possible to cause each of the OFDM part and the DSSS part to operate in an optimal condition.

According to an embodiment of this disclosure, there is provided a DSSS and OFDM two-way waiting reception method in a wireless LAN apparatus supporting DSSS and OFDM, the DSSS and OFDM two-way waiting reception method including the steps of: (a) performing each of DSSS correlation detection and OFDM correlation detection so as to determine whether a received signal is a DSSS signal or an OFDM signal; (b) performing OFDM reception as a result of generation of an OFDM search trigger because of detection of OFDM correlation; (c) interrupting step (b) and switching to DSSS reception on generation of a DSSS search trigger due to detection of DSSS correlation in step (b); and (d) performing the DSSS reception.

According to an embodiment of this disclosure, there is provided a wireless LAN apparatus supporting DSSS and OFDM, including: a correlation detection part configured to perform each of DSSS correlation detection and OFDM correlation detection so as to determine whether a received signal is a DSSS signal or an OFDM signal; an OFDM reception part configured to perform OFDM reception; and a DSSS reception part configured to perform DSSS reception, wherein the OFDM reception in the OFDM reception part is interrupted and switched to the DSSS reception in the DSSS reception part on generation of a DSSS search trigger due to detection of DSSS correlation in the correlation detection part during the OFDM reception in the OFDM reception part.

According to one aspect of the present invention, it is possible to provide a DSSS and OFDM two-way waiting reception method and a wireless LAN apparatus that perform DSSS AGC processing with accuracy.

BRIEF DESCRIPTION OF THE DRAWINGS

Other aspects, features and advantages will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

First Embodiment

Figure 1:
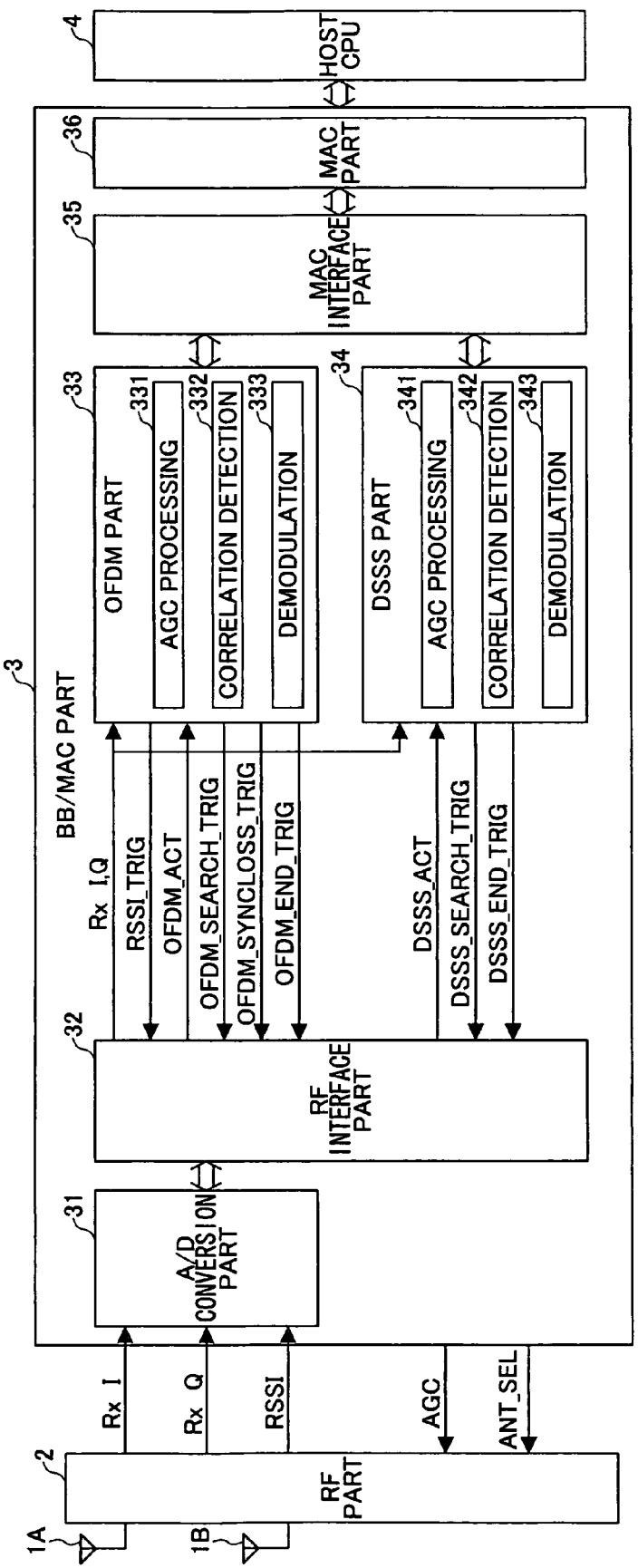
FIG. 1 is a block diagram showing a wireless LAN apparatus according to a first embodiment of the present invention.

FIG. 1 is a block diagram showing a wireless LAN apparatus according to a first embodiment of the present invention. FIG. 1 shows a reception-related function part of the wireless LAN apparatus, and a graphical illustration of a transmission-related function part of the wireless LAN apparatus is omitted.

Referring to FIG. 1, the wireless LAN apparatus includes antennas 1A and 1B, an RF part 2 formed of a single IC chip, and a BB/MAC part 3 formed of another single IC chip. The BB/MAC part 3 is connected to a host CPU 4 of a host apparatus such as a personal computer (PC) or a printer including an application that performs communications through a wireless LAN.

The BB/MAC part 3 includes an A/D conversion part 31, an RF interface part 32, an OFDM part 33, and a DSSS part 34. The I component (RX I) and the Q component (RX Q) of a received signal after conversion (mixing with a carrier wave frequency signal) output from the RF part 2, and an RSSI (Received Signal Strength Indication) signal indicating the strength of the received signal are input to the A/D conversion part 31 and converted into digital values in the A/D conversion part 31. The RF interface part 32 provides interface with the RF part 2, and controls the operations of the OFDM part 33 and the DSSS part 34. The OFDM part 33 performs OFDM demodulation. The DSSS part 34 performs DSSS demodulation. The OFDM part 33 includes an AGC processing part 331 to control the gain of the RF part 2, a correlation detection part 332 to determine whether a signal is of a desired modulation type, and a demodulation part 333 to demodulate data. The DSSS part 34 includes an AGC processing part 341 to control the gain of the RF part 2, a correlation detection part 342 to determine whether a signal is of a desired modulation type, and a demodulation part 343 to demodulate data.

Of the signals exchanged between the RF interface part 32 and the OFDM and DSSS parts 33 and 34, those related to the present invention include the following:

Rx I, Q: Digitized received signal;

RSSI_TRIG: Trigger signal to be generated at the time of carrier detection;

OFDM_ACT: Signal to be generated while the OFDM part 33 is in operation;

OFDM_SEARCH_TRIG: Trigger signal to be generated when an OFDM signal is detected by the correlation detection part 332 of the OFDM part 33;

OFDM_SYNCLOSS_TRIG: Trigger signal to be generated in the case of occurrence of synchronization error in the demodulation part 333 of the OFDM part 33;

OFDM_END_TRIG: Trigger signal to be generated when demodulation ends in the demodulation part 333 of the OFDM part 33;

DSSS_ACT: Signal to be generated while the DSSS part 34 is in operation;

DSSS_SEARCH_TRIG: Trigger signal to be generated when a DSSS signal is detected by the correlation detection part 342 of the OFDM part 34; and DSSS_END_TRIG: Trigger signal to be generated when demodulation ends in the demodulation part 343 of the OFDM part 34.

The BB/MAC part 3 further includes a MAC interface part 35 and a MAC part 36. The MAC interface part 35 provides interface with the MAC part 36. The MAC part 36 performs media access control (MAC) such as CSMA/CA (Carrier Sense Multiple Access with Collision Avoidance).

Figure 2:
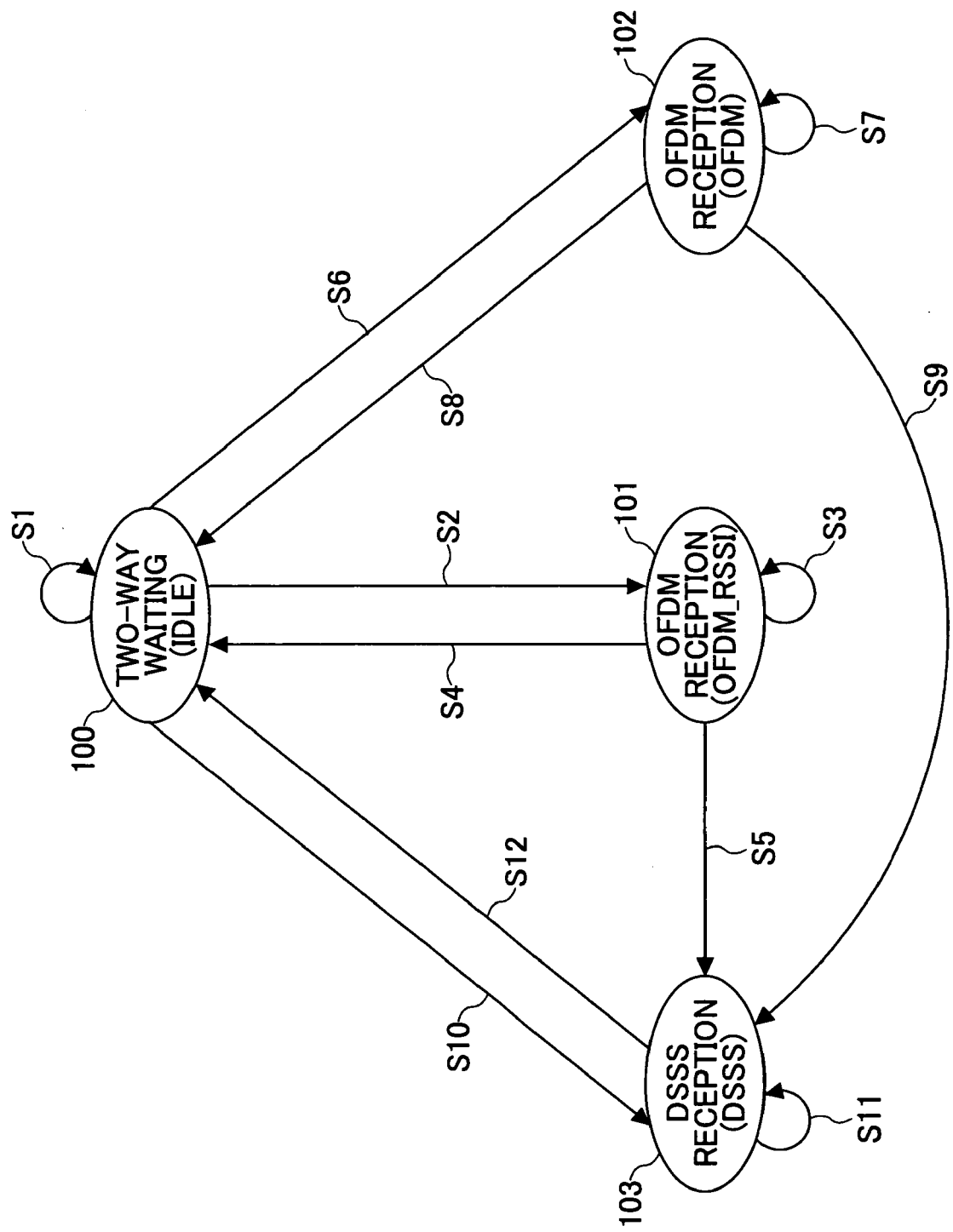
FIG. 2 is a state diagram showing processing in an IEEE 802.11g mode according to the first embodiment of the present invention.

FIG. 2 is a state diagram showing processing in an IEEE 802.11g mode compliant with both DSSS and OFDM according to this embodiment. The processing is controlled by the RF interface part 32 of the BB/MAC part 3.

Referring to FIG. 2, there exist a two-way waiting state 100 that is an idle state (IDLE), an RSSI-activated OFDM reception state 101, an OFDM search-activated OFDM reception state 102, and a DSSS reception state 103.

First, if none of the RSSI trigger (RSSI_TRIG), the OFDM search trigger (OFDM_SEARCH_TRIG), and the DSSS search trigger (DSSS_SEARCH_TRIG) is generated, in step S1, the two-way waiting state 100 is maintained.

Figure 3:
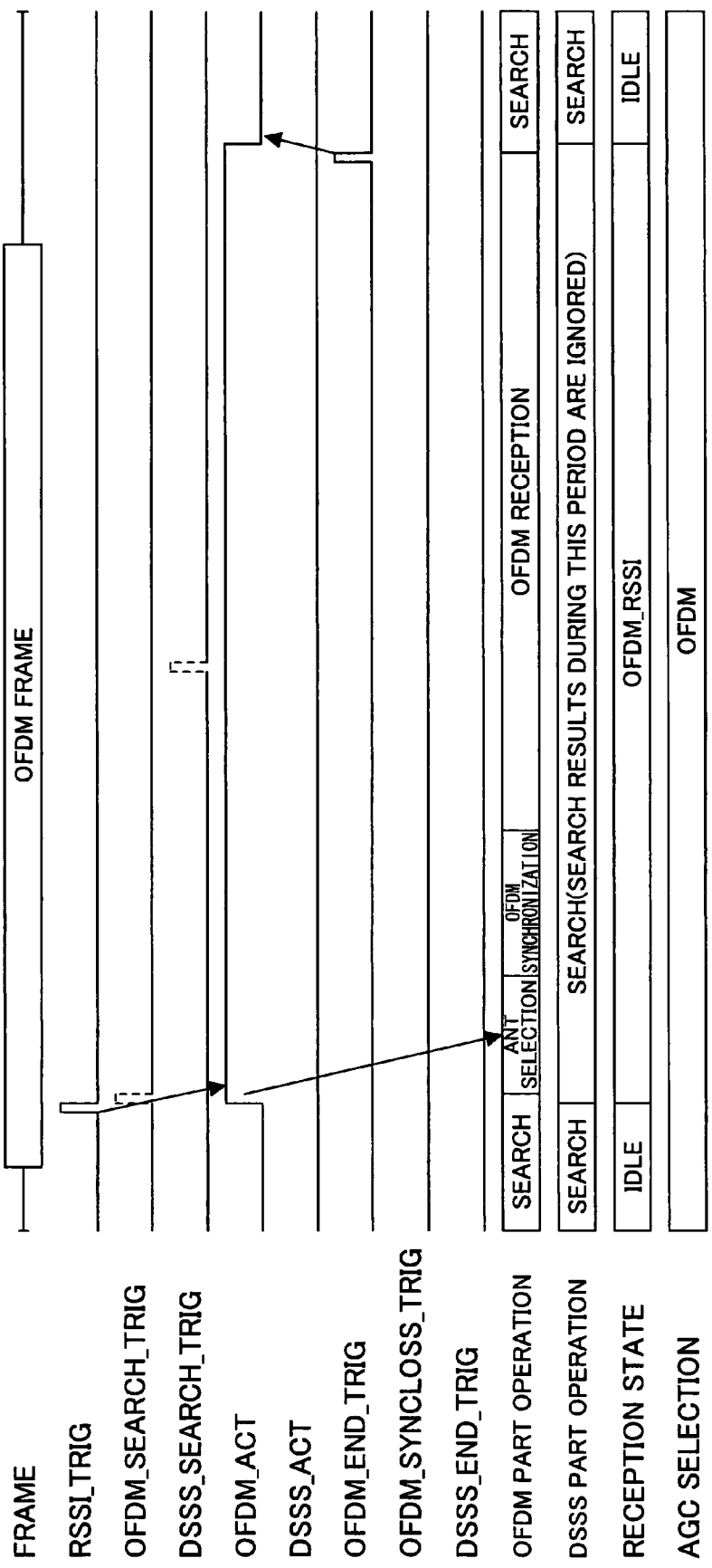
FIG. 3 is a time chart showing RSSI-activated OFDM reception according to the first embodiment of the present invention.

If the RSSI trigger is generated in the two-way waiting state 100, in step S2, the transition to the RSSI-activated OFDM reception state 101 is made. That is, switching from the two-way waiting state 100 to the RSSI-activated OFDM reception state 101 is performed. FIG. 3 is a time chart showing RSSI-activated OFDM reception.

Referring back to FIG. 2, in step S3, the RSSI-activated OFDM reception state 101 is maintained during OFDM reception after entrance into the RSSI-activated OFDM reception state 101. When the OFDM end trigger (OFDM_END_TRIG) is generated, in step S4, the transition to the two-way waiting state 100 is made.

Figure 4:
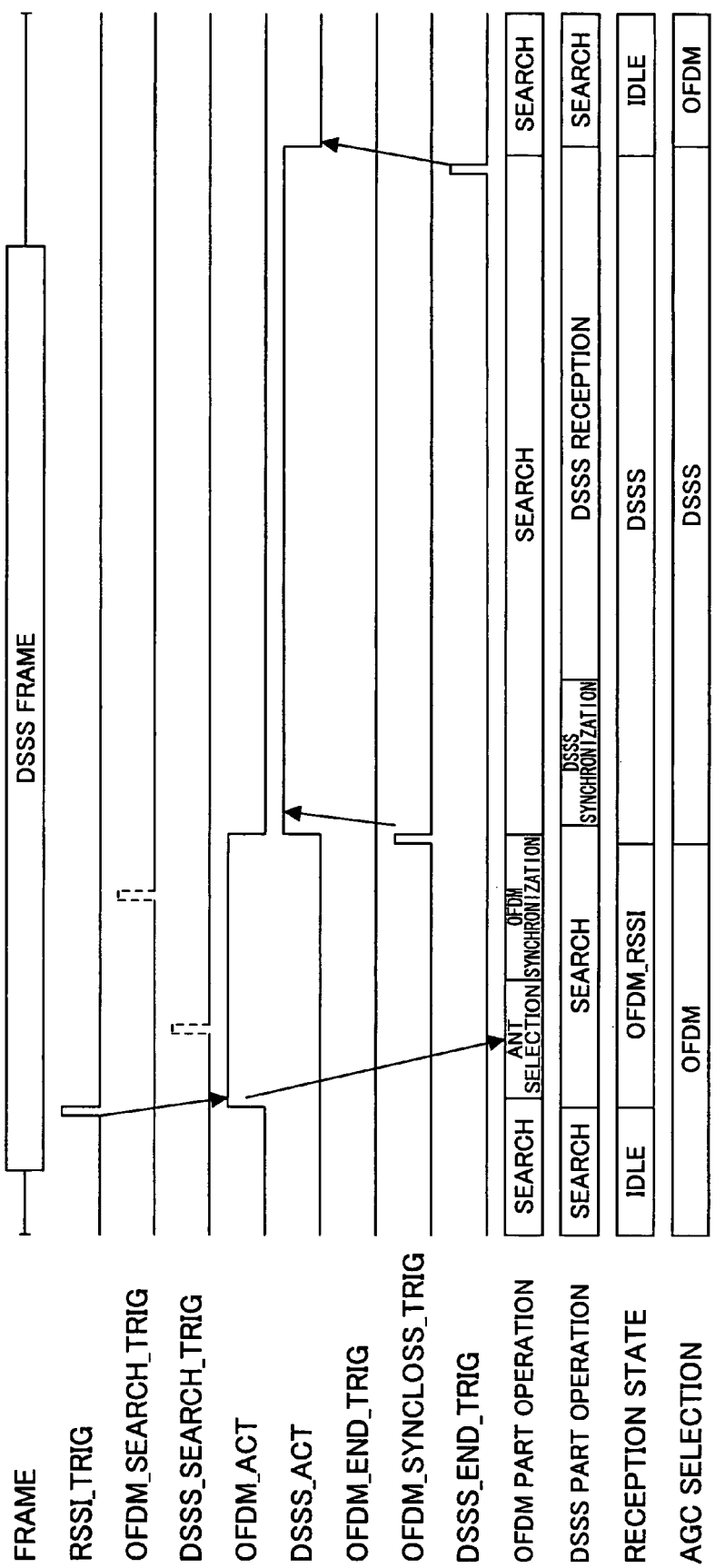
FIG. 4 is a time chart showing DSSS reception to which the transition from the RSSI-activated OFDM reception is made according to the first embodiment of the present invention.

On the other hand, if the OFDM synchronization loss trigger (OFDM_SYNCLOSS_TRIG) is generated in the RSSI-activated OFDM reception state 101, in step S5, the transition to the DSSS reception state 103 is made. FIG. 4 is a time chart showing DSSS reception to which the transition from the RSSI-activated OFDM reception is made.

That is, in the case of arrival of any signal (detected by a rise of the RSSI signal), OFDM having a shorter processing time in the preamble is tried first, and if the signal cannot be demodulated by OFDM, there occurs switching to processing by DSSS. In the case of switching to DSSS after demodulation failure by OFDM, approximately 8 µs (as processing in the preamble by OFDM, 0.8 µs for generation of the initial trigger by correlation detection in the first symbol, 5 µs for AGC processing using the RSSI signal and antenna switching [up to twice] at the time of burst reception, and 3 µs for the subsequent detailed correlation detection, synchronization, and coarse adjustment of frequency offset) have already been spent. However, the preamble time according to DSSS is 72 µs, and AGC processing by DSSS (several times of feedback until the gain becomes a predetermined value since AGC processing using the RSSI signal cannot be performed) can be performed in approximately 10 µs. Therefore, even if the subsequent training takes 54 µs, processing can be completed in time.

Figure 5:
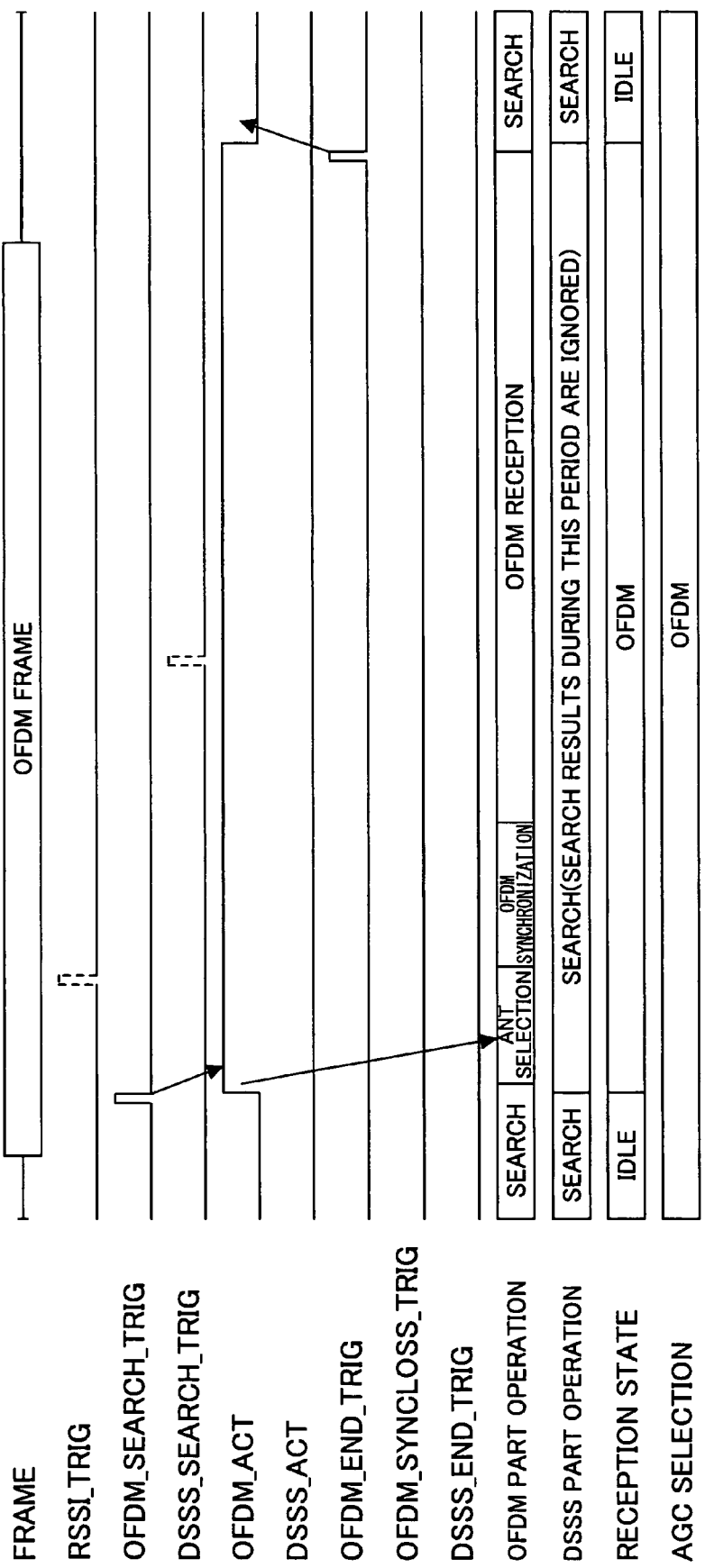
FIG. 5 is a time chart showing OFDM search-activated OFDM reception according to the first embodiment of the present invention.

Next, referring back to FIG. 2, if the OFDM search trigger is generated in the two-way waiting state 100, in step S6, the transition to the OFDM search-activated OFDM reception state 102 is made. FIG. 5 is a time chart showing OFDM search-activated OFDM reception.

In step S7 of FIG. 2, the OFDM search-activated OFDM reception state 102 is maintained during OFDM reception after entrance into the OFDM search-activated OFDM reception state 102. When the OFDM end trigger (OFDM_END_TRIG) is generated, or if the OFDM synchronization loss trigger is generated alone, in step S8, the transition to the two-way waiting state 100 is made.

Figure 6:
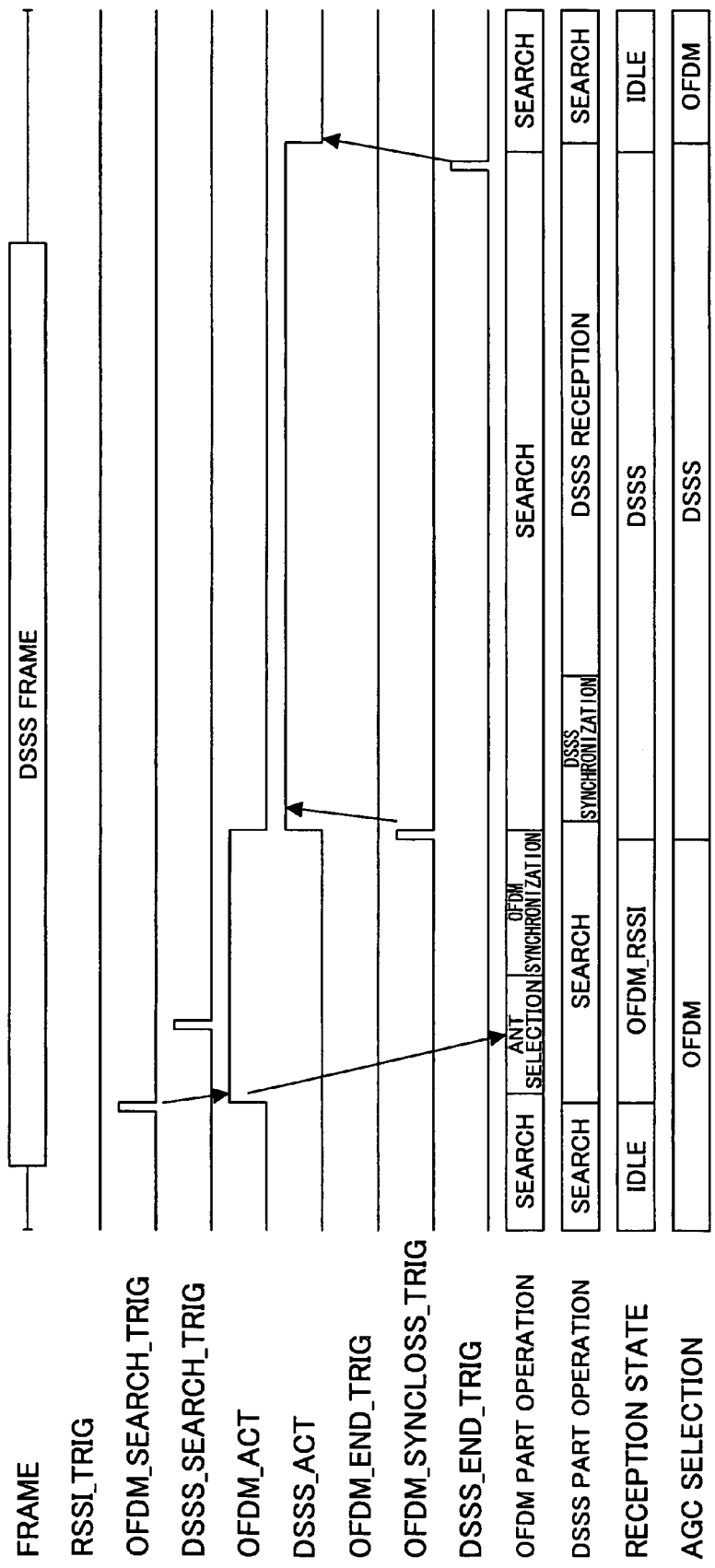
FIG. 6 is a time chart showing DSSS reception to which the transition from the OFDM search-activated OFDM reception is made according to the first embodiment of the present invention.

Further, if the DSSS search trigger is generated and the OFDM synchronization loss trigger is generated in the OFDM search-activated OFDM reception state 102, in step S9, the transition is made to the DSSS reception state 103. FIG. 6 is a time chart showing DSSS reception to which the transition from the OFDM search-activated OFDM reception is made. In this case, the OFDM search trigger is generated earlier. Therefore, the transition is made on condition that not only the OFDM synchronization loss trigger is generated but also the DSSS search trigger is generated. OFDM having a shorter processing time in the preamble is also performed first in this case. Accordingly, although the transition to DSSS is made after demodulation failure by OFDM, processing can be completed within the preamble time.

Figure 7:
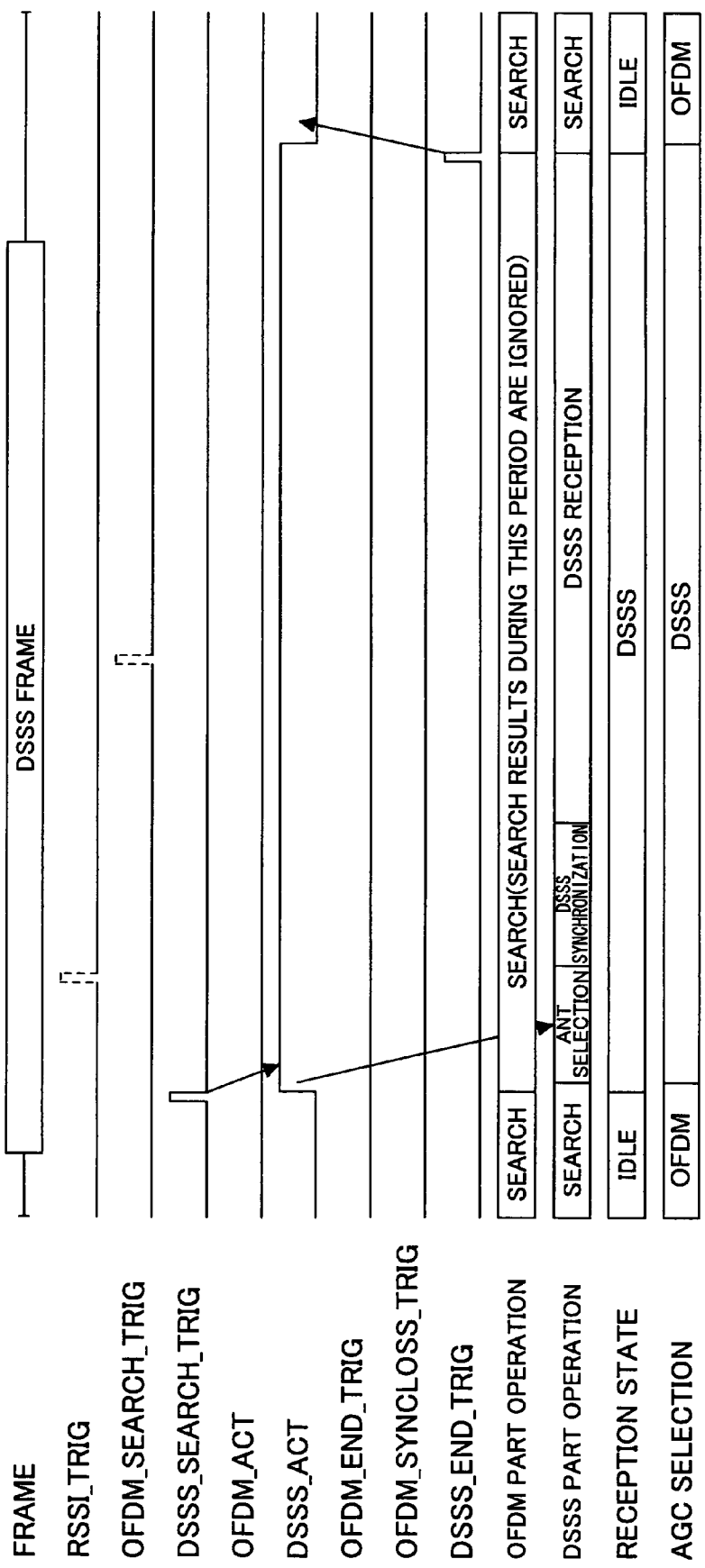
FIG. 7 is a time chart showing DSSS search-activated DSSS reception according to the first embodiment of the present invention.

Next, referring back to FIG. 2, if the DSSS search trigger is generated in the two-way waiting state 100, in step S10, the transition to the DSSS reception state 103 is made. FIG. 7 is a time chart showing DSSS search-activated DSSS reception.

In step S11 of FIG. 2, this DSSS reception state 103 is maintained during DSSS reception, and when the DSSS end trigger is generated, in step S12, the transition to the two-way waiting state 100 is made.

Figure 8:
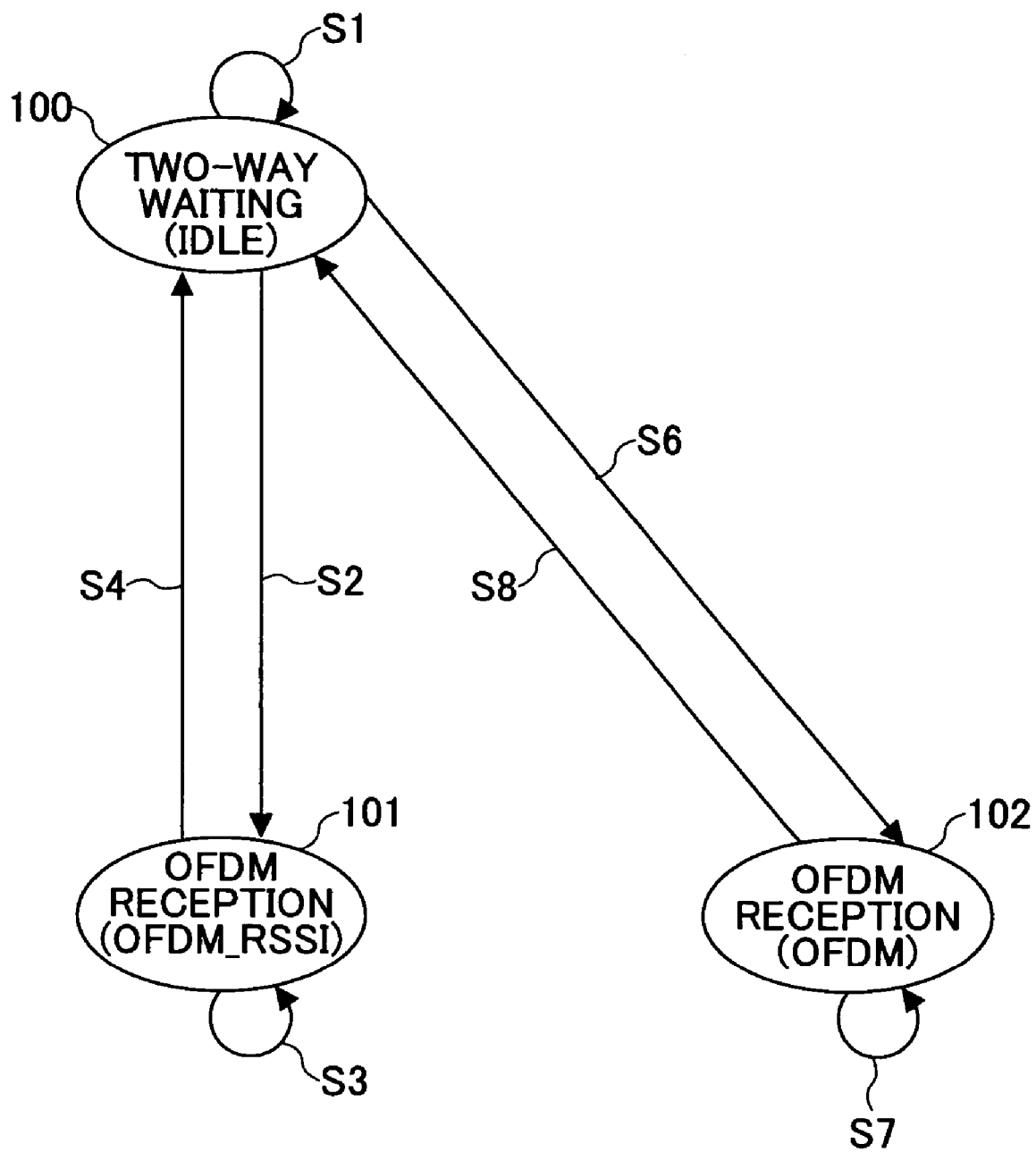
FIG. 8 is a state diagram showing processing in an IEEE 802.11a mode according to the first embodiment of the present invention.

Next, FIG. 8 is a state diagram showing processing in an 802.11a mode according to this embodiment. According to IEEE 802.11a, it is only necessary to support OFDM. According to this embodiment, however, the 802.11a mode is configured to have some of the states of the 802.11g mode in order to establish agreement therewith. The states 100, 101, and 102 and the transitions among them are the same as those shown in FIG. 2.

Figure 9:
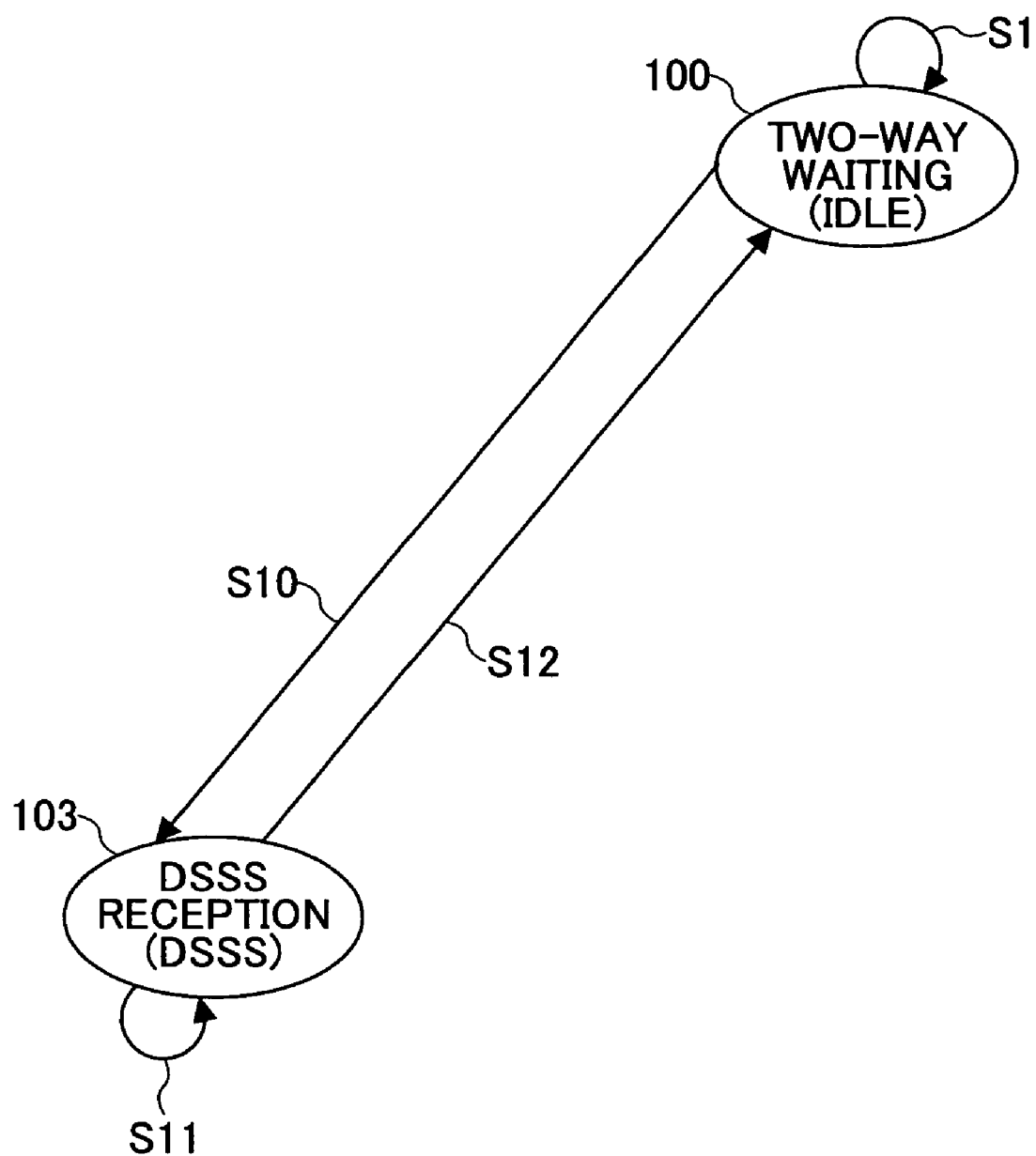
FIG. 9 is a state diagram showing processing in an IEEE 802.11b mode according to the first embodiment of the present invention.

Next, FIG. 9 is a state diagram showing processing in an 802.11b mode according to this embodiment. According to IEEE 802.11b, it is only necessary to support DSSS. According to this embodiment, however, the 802.11b mode is configured to have some of the states of the 802.11g mode in order to establish agreement therewith. The states 100 and 103 and the transitions between them are the same as those shown in FIG. 2.

Thus, in the case of supporting both DSSS and OFDM, the DSSS part 34 compliant with DSSS or the OFDM part 33 compliant with OFDM is caused to operate selectively depending on the reception state of a signal. Accordingly, it is possible to cause the OFDM part 33 and the DSSS part 34 to perform processing such as AGC separately, so that it is possible to cause each of the OFDM part 33 and the DSSS part 34 to operate in an optimal condition. That is, in the OFDM part 33 and the DSSS part 34, the correlation detection parts 332 and 342 are caused to operate constantly, and the sequential operations of the OFDM part 33 and the DSSS part 34 are performed in consideration of their detection operations. Therefore, it is possible to cause each of the OFDM part 33 and the DSSS part 34 to perform an optimal AGC operation, and it is possible to eliminate an inefficient operation of starting unexceptionally with OFDM in spite of apparent arrival of a DSSS signal.

Thus, according to this embodiment, there is provided a DSSS and OFDM two-way waiting reception method in a wireless LAN apparatus supporting DSSS and OFDM, the DSSS and OFDM two-way waiting reception method including the steps of: (a) maintaining a two-way waiting state if none of an RSSI trigger, an OFDM search trigger, and a DSSS search trigger is generated; (b) making a transition (switching) to an RSSI-activated OFDM reception state if the RSSI trigger is generated in the two-way waiting state; (c) making a transition (switching) to a DSSS reception state if an OFDM synchronization loss trigger is generated in the RSSI-activated OFDM reception state; (d) making a transition (switching) to an OFDM search-activated OFDM reception state if the OFDM search trigger is generated in the two-way waiting state; (e) making a transition (switching) to the DSSS reception state if the DSSS search trigger is generated and the OFDM synchronization loss trigger is generated in the OFDM search-activated OFDM reception state; and (f) making a transition (switching) to the DSSS reception state if the DSSS search trigger is generated in the two-way waiting state.

Further according to this embodiment, there is provided a wireless LAN apparatus supporting DSSS and OFDM, including: an RF interface part configured to provide interface with an RF part and to control an operation of each of a DSSS part to perform DSSS demodulation and an OFDM part to perform OFDM demodulation, wherein the RF interface part causes a two-way waiting state to be maintained if none of an RSSI trigger, an OFDM search trigger, and a DSSS search trigger is generated; causes a transition (switching) to an RSSI-activated OFDM reception state if the RSSI trigger is generated in the two-way waiting state; causes a transition (switching) to a DSSS reception state if an OFDM synchronization loss trigger is generated in the RSSI-activated OFDM reception state; causes a transition (switching) to an OFDM search-activated OFDM reception state if the OFDM search trigger is generated in the two-way waiting state; causes a transition (switching) to the DSSS reception state if the DSSS search trigger is generated and the OFDM synchronization loss trigger is generated in the OFDM search-activated OFDM reception state; and causes a transition (switching) to the DSSS reception state if the DSSS search trigger is generated in the two-way waiting state.

Second Embodiment

Next, a description is given of a second embodiment of the present invention.

A wireless LAN apparatus according to the second embodiment has the same configuration as the wireless LAN apparatus of the first embodiment shown in FIG. 1, and accordingly, a description thereof is omitted.

A description is given below, with reference to FIGS. 1, 10, and 11, of a specific operation according to this embodiment. First, when a carrier is detected, the correlation detection part 332 of the OFDM part 33 and the correlation detection part 342 of the DSSS part 34 start correlation detection. In this correlation detection, the correlation detection part 342 of the DSSS part 34 performs Barker detection. This Barker detection has good noise immunity and is highly discriminative even if the input signal is an OFDM preamble signal. Therefore, it is desirable to give preference to the detection result of the correlation detection part 342.

Accordingly, even if a DSSS signal is input and an OFDM_SEARCH_TRIG is generated, the input signal is determined as a DSSS signal and processing is immediately handed over to the DSSS part 34 if Barker detection is performed before the OFDM synchronization error is detected. As a result, it is possible to put time into AGC processing in the DSSS part 34, so that it is possible to perform AGC processing with more accuracy.

Figure 10:
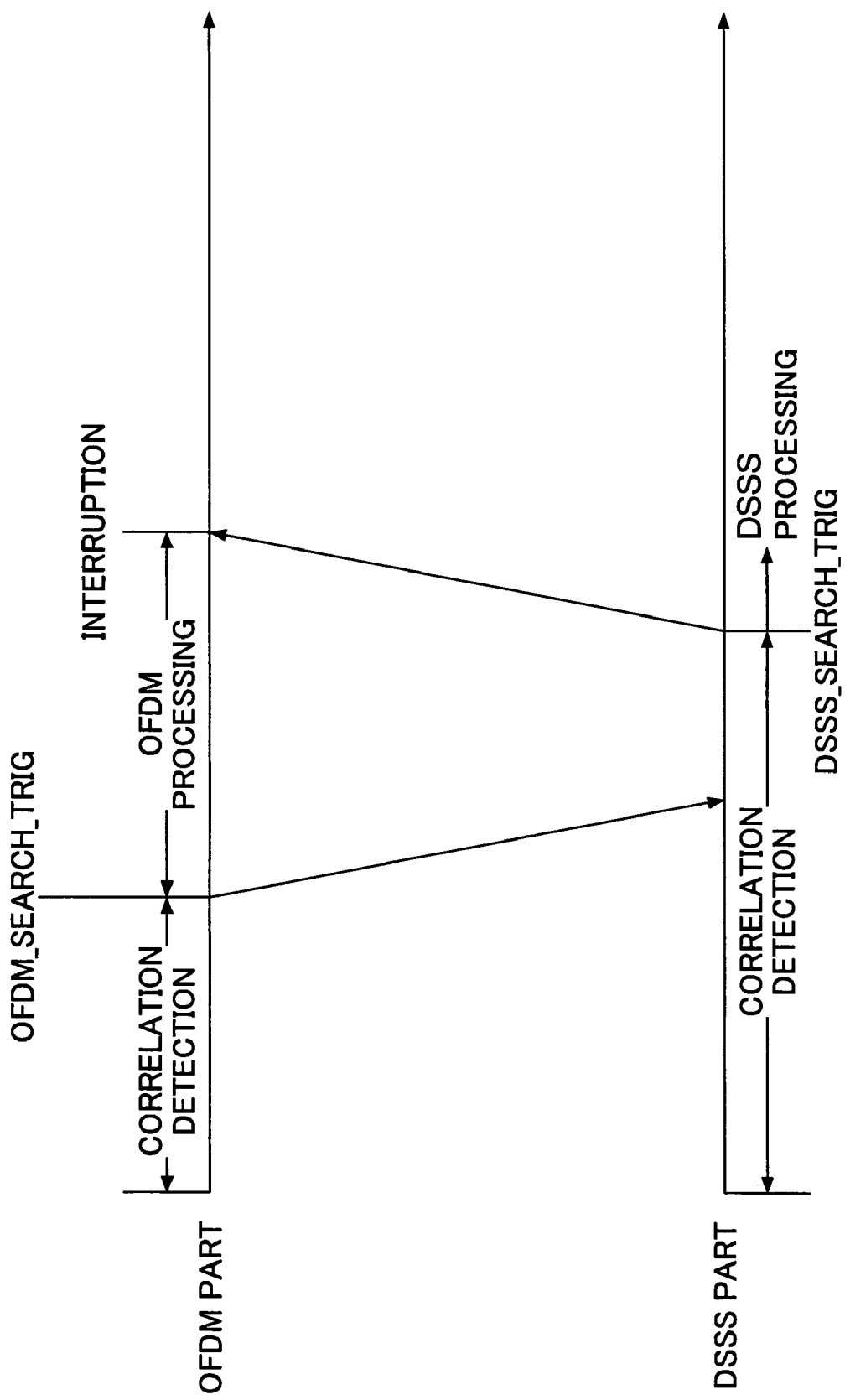
FIG. 10 is a diagram showing processing of an OFDM part and a DSSS part according to a second embodiment of the present invention.
Figure 11:
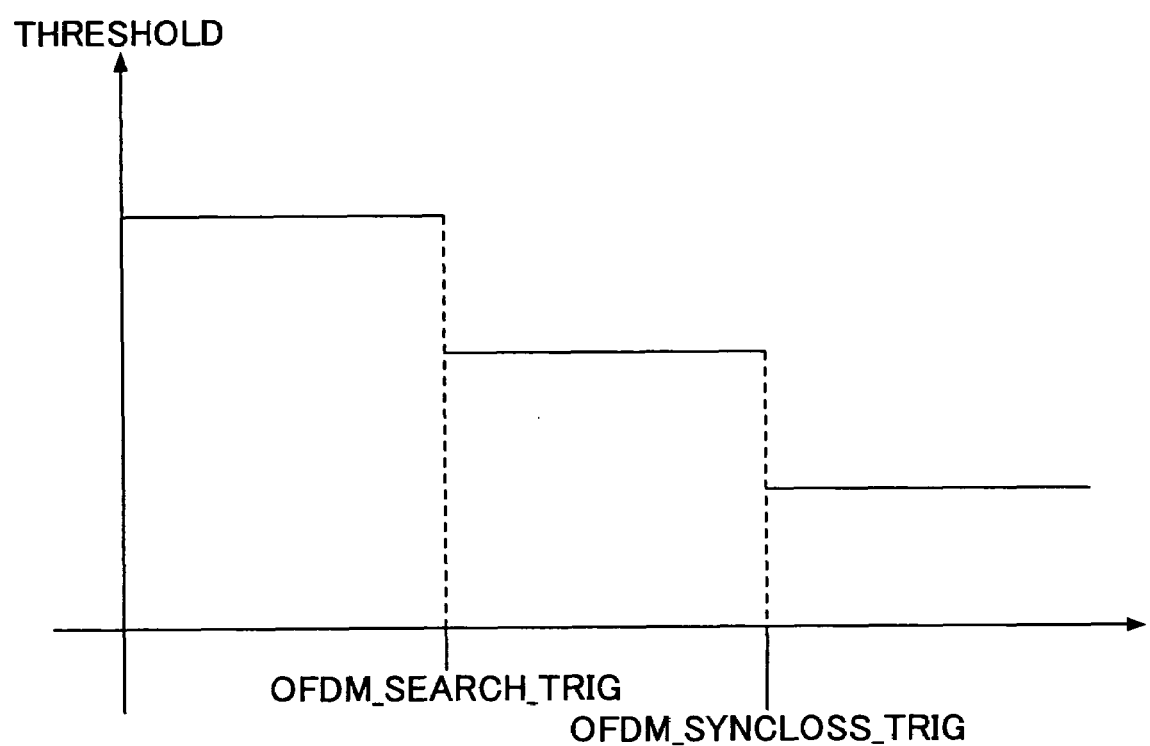
FIG. 11 is a diagram showing a variable threshold (with three levels) according to the second embodiment of the present invention.

A description is given specifically of this using FIG. 10. FIG. 10 is a diagram showing processing of the OFDM part 33 and the DSSS part 34. First, both the OFDM part 33 and the DSSS part 34 perform correlation detection. The OFDM part 33 generates an OFDM_SEARCH_TRIG signal, and starts OFDM processing. At this point, the DSSS part 34 continues performing correlation detection. When the DSSS part 34 detects a DSSS signal by Barker detection, the DSSS part 34 generates a DSSS_SEARCH_TRIG signal. Since the Barker detection is given preference, the OFDM part 33 interrupts its OFDM processing, and the DSSS part 34 performs DSSS processing.

Next, a description is given of the operation of changing a threshold level according to this embodiment. According to this embodiment, the threshold level for detecting DSSS correlation is variable based on the level of an input DSSS signal. By way of example, referring to FIG. 11, the lower the threshold level, the more rigorous the determination as to whether the input signal is a DSSS signal. That is, an input signal determined as a DSSS signal with a lower threshold level has a higher probability of being a DSSS signal.

The initial threshold level at the beginning of correlation detection is set so as to make a rough or loose determination in order to detect a DSSS signal without fail. The initial threshold level may be relatively high as shown in FIG. 11 with the gain of the input (received) signal being taken into consideration. The correlation detection during OFDM processing after generation of the OFDM_SEARCH_TRIG signal is used complementarily, and should determine with certainty that the input signal is a DSSS signal. Accordingly, in the OFDM reception process, the threshold level is set so as to make a strict determination. At this stage, the threshold level may be lower than its initial level with the gain of the input signal being taken into consideration.

Next, after an OFDM_SYNCLOSS_TRIG signal is generated because of synchronization error in the OFDM processing and the processing is handed over to the DSSS part 34, the threshold level is further lowered. AGC processing is performed after the processing is handed over to the DSSS part 34. At this point, the purpose of the determination is to determine disappearance of the DSSS signal rather than to determine whether the input signal is a DSSS signal.

It is necessary to return to the initial state (100 of FIG. 2) (the state of awaiting initial trigger detection by OFDM and DSSS) as soon as the DSSS signal disappears in order to handle a state change during the period of the DSSS preamble signal, which is extremely long. Thus, the wireless LAN apparatus according to this embodiment has a variable threshold level. In particular, as described above, the wireless LAN apparatus may have three threshold levels, and may be switchable among the three threshold levels.

As a variation, the threshold level in the OFDM reception process may be higher than the initial threshold level in the correlation detection process.

Thus, according to this embodiment, there is provided a DSSS and OFDM two-way waiting reception method in a wireless LAN apparatus supporting DSSS and OFDM, the DSSS and OFDM two-way waiting reception method including the steps of (a) performing each of DSSS correlation detection and OFDM correlation detection so as to determine whether a received signal is a DSSS signal or an OFDM signal (correlation detection process); (b) performing OFDM reception as a result of generation of an OFDM search trigger because of detection of OFDM correlation (OFDM reception process); (c) interrupting step (b) and switching to DSSS reception on generation of a DSSS search trigger due to detection of DSSS correlation in step (b) (DSSS reception switching process); and (d) performing the DSSS reception (DSSS reception process).

Further, according to this embodiment, there is provided a wireless LAN apparatus supporting DSSS and OFDM including: a correlation detection part configured to perform each of DSSS correlation detection and OFDM correlation detection so as to determine whether a received signal is a DSSS signal or an OFDM signal; an OFDM reception part configured to perform OFDM reception; and a DSSS reception part configured to perform DSSS reception, wherein the OFDM reception in the OFDM reception part is interrupted and switched to the DSSS reception in the DSSS reception part on generation of a DSSS search trigger due to detection of DSSS correlation in the correlation detection part during the OFDM reception in the OFDM reception part.

The present invention is not limited to the specifically disclosed embodiments, and variations and modifications may be made without departing from the scope of the present invention.

The present application is based on Japanese Priority Patent Applications No. 2005-112212, filed on Apr. 8, 2005, and No. 2005-112213, filed on Apr. 8, 2005, the entire contents of which are hereby incorporated by reference.

What is claimed is:

1. A DSSS and OFDM two-way waiting reception method in a wireless LAN apparatus supporting DSSS and OFDM, the DSSS and OFDM two-way waiting reception method comprising the steps of:
 (a) maintaining in the wireless LAN apparatus a two-way waiting state if none of an RSSI trigger, an OFDM search trigger, and a DSSS search trigger is generated;
 (b) making a transition to an RSSI-activated OFDM reception state in the wireless LAN apparatus if the RSSI trigger is generated in the two-way waiting state;
 (c) making a transition to a DSSS reception state in the wireless LAN apparatus if an OFDM synchronization loss trigger is generated in the RSSI-activated OFDM reception state;
 (d) making a transition to an OFDM search-activated OFDM reception state in the wireless LAN apparatus if the OFDM search trigger is generated in the two-way waiting state;
 (e) making a transition to the DSSS reception state in the wireless LAN apparatus if the DSSS search trigger is generated and the OFDM synchronization loss trigger is generated in the OFDM search-activated OFDM reception state; and
 (f) making a transition to the DSSS reception state in the wireless LAN apparatus if the DSSS search trigger is generated in the two-way waiting state.

2. The DSSS and OFDM two-way waiting reception method as claimed in claim 1, further comprising the steps of:
 (g) maintaining the RSSI-activated OFDM reception state during OFDM reception after the transition to the RSSI-activated OFDM reception state;
 (h) maintaining the OFDM search-activated OFDM reception state during OFDM reception after the transition to the OFDM search-activated OFDM reception state; and
 (i) maintaining the DSSS reception state during DSSS reception after the transition to the DSSS reception state.

3. The DSSS and OFDM two-way waiting reception method as claimed in claim 1, further comprising the steps of:
 (g) making a transition to the two-way waiting state if an OFDM end trigger is generated after the transition to the RSSI-activated OFDM reception state;
 (h) making a transition to the two-way waiting state if one of the OFDM end trigger and the OFDM synchronization loss trigger is generated after the transition to the OFDM search-activated OFDM reception state; and (i) making a transition to the two-way waiting state if a DSSS end trigger is generated after the transition to the DSSS reception state.

4. A wireless LAN apparatus supporting DSSS and OFDM, comprising:
an RF interface part configured to provide interface with an RF part and to control an operation of each of a DSSS part to perform DSSS demodulation and an OFDM part to perform OFDM demodulation,
wherein the RF interface part causes a two-way waiting state to be maintained if none of an RSSI trigger, an OFDM search trigger, and a DSSS search trigger is generated;
causes a transition to an RSSI-activated OFDM reception state if the RSSI trigger is generated in the two-way waiting state;
causes a transition to a DSSS reception state if an OFDM synchronization loss trigger is generated in the RSSI-activated OFDM reception state;
causes a transition to an OFDM search-activated OFDM reception state if the OFDM search trigger is generated in the two-way waiting state;
causes a transition to the DSSS reception state if the DSSS search trigger is generated and the OFDM synchronization loss trigger is generated in the OFDM search-activated OFDM reception state; and
causes a transition to the DSSS reception state if the DSSS search trigger is generated in the two-way waiting state.

5. The wireless LAN apparatus as claimed in claim 4, wherein the RF interface part causes the RSSI-activated OFDM reception state to be maintained during OFDM reception after the transition to the RSSI-activated OFDM reception state;
causes the OFDM search-activated OFDM reception state to be maintained during OFDM reception after the transition to the OFDM search-activated OFDM reception state; and
causes the DSSS reception state to be maintained during DSSS reception after the transition to the DSSS reception state.

6. The wireless LAN apparatus as claimed in claim 4, wherein the RF interface part causes a transition to the two-way waiting state if an OFDM end trigger is generated after the transition to the RSSI-activated OFDM reception state;
causes a transition to the two-way waiting state if one of the OFDM end trigger and the OFDM synchronization loss trigger is generated after the transition to the OFDM search-activated OFDM reception state; and
causes a transition to the two-way waiting state if a DSSS end trigger is generated after the transition to the DSSS reception state.

7. A DSSS and OFDM two-way waiting reception method in a wireless LAN apparatus supporting DSSS and OFDM, the DSSS and OFDM two-way waiting reception method comprising the steps of:

(a) performing DSSS correlation detection and OFDM correlation detection in parallel in the wireless LAN apparatus so as to determine whether a received signal is a DSSS signal or an OFDM signal;
(b) switching from the OFDM correlation detection to OFDM reception in the wireless LAN apparatus, in response to generation of an OFDM search trigger because of detection of OFDM correlation in the OFDM correlation detection, while performing the DSS correlation detection;
(c) interrupting the OFDM reception and switching from the DSSS correlation detection to DSSS reception in the wireless LAN apparatus, in response to generation of a DSSS search trigger due to detection of DSSS correlation in the DSSS correlation detection; and
d) performing the DSSS receptions,
wherein a threshold level for detecting the DSSS correlation is higher in the DSSS correlation detection of said stop (a) than in the DSSS correlation detection of said step (b), and is higher in the DSSS correlation detection of said step (b) than in the DSSS reception of said step (d).

8. The DSSS and OFDM two-way waiting reception method as claimed in claim 7, wherein the threshold level for detecting the DSSS correlation is lowered in response to the generation of the OFDM search trigger and is further lowered in response to the generation or the DSSS search trigger.

9. A wireless LAN apparatus supporting DSSS and OFDM, comprising:
a correlation detection part configured to perform each of DSSS correlation detection and OFDM correlation detection so as to determine whether a received signal is a DSSS signal or an OFDM signal;
an OFDM reception part configured to perform OFDM reception; and
a DSSS reception part configured co perform DSSS reception,
wherein the OFDM reception in the OFDM reception part is interrupted and switched to the DSSS reception in the DSSS reception part in response to generation of a DSSS search trigger due to detection of DSSS correlation in the correlation detection part during the OFDM reception in the OFDM reception part, and
the correlation detection part is configured to vary a threshold level for detecting the DSSS correlation so that the threshold level is higher in the DSSS correlation detection performed in parallel with the OFDM correlation detection than in the DSSS correlation detection performed during the OFDM reception and is higher in the DSSS correlation detection performed during the OFDM reception than in the DSSS reception.

* * * * *